(12) United States Patent
Toko et al.

(10) Patent No.: US 10,534,231 B2
(45) Date of Patent: Jan. 14, 2020

(54) LIGHTING DEVICE

(71) Applicant: STANLEY ELECTRIC CO., LTD., Tokyo (JP)

(72) Inventors: Yasuo Toko, Yokohama (JP); Yoshifumi Takao, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/226,325

(22) Filed: Dec. 19, 2018

(65) Prior Publication Data

US 2019/0187503 A1    Jun. 20, 2019

(30) Foreign Application Priority Data

Dec. 20, 2017 (JP) ................................ 2017-243603

(51) Int. Cl.
  *G09G 3/36* (2006.01)
  *G02F 1/13* (2006.01)
  (Continued)

(52) U.S. Cl.
  CPC ........... *G02F 1/13454* (2013.01); *B60Q 1/04* (2013.01); *B60Q 1/1423* (2013.01);
  (Continued)

(58) Field of Classification Search
  None
  See application file for complete search history.

(56) References Cited

U.S. PATENT DOCUMENTS

2009/0147221 A1*  6/2009  Krijn ................. G02B 27/1046
                                                    353/33
2014/0152988 A1*  6/2014  Liu ..................... A61B 5/14532
                                                    356/364
(Continued)

FOREIGN PATENT DOCUMENTS

DE    10 2013 113 807 A1    6/2015
DE    10 2016 109 530 A1    11/2017
(Continued)

OTHER PUBLICATIONS

The extended European Search Report for the related European Patent Application No. 18214674.6 dated May 17, 2019.

*Primary Examiner* — Dedei K Hammond
(74) *Attorney, Agent, or Firm* — Kenealy Vaidya LLP (57) ABSTRACT

A lighting device includes: a liquid crystal element having electrode pattern including a first portion and a second portion; drive circuit connected to the electrode pattern; polarizer disposed in front of the liquid crystal element and separated from the liquid crystal element in optical axis direction; analyzer disposed at rear of the liquid crystal element, and separated from the liquid crystal element in optical axis direction, wherein the polarizer and the analyzer constitute crossed Nicol polarizers; light source for supplying lights to the liquid crystal element within a predetermined incident angle range; and projection optical system projecting lights transmitted through the liquid crystal element forwardly; wherein the polarizer and the analyzer locally overlap with the liquid crystal element in projection normal to the liquid crystal element, and when the light source is turned on, the drive circuit supplies drive signal to the first portion of the electrode pattern which applies or releases voltages in compliance with circumstances, and supplies drive signal to the second portion of the electrode pattern which continuously applies voltage, lights transmit- (Continued)

ting through the first portion of the electrode pattern and projecting forward transmit both the polarizer and the analyzer, and lights transmitting through the second portion of the electrode pattern and projecting forward include components which do not transmit at least one of the polarizer and the analyzer.

10 Claims, 5 Drawing Sheets

(51) Int. Cl.
*F21S 41/63* (2018.01)
*G02F 1/1345* (2006.01)
*F21S 41/663* (2018.01)
*F21S 41/657* (2018.01)
*B60Q 1/04* (2006.01)
*B60Q 1/14* (2006.01)
*H05B 37/02* (2006.01)
*F21S 41/64* (2018.01)

(52) U.S. Cl.
CPC ........... *F21S 41/635* (2018.01); *F21S 41/645* (2018.01); *F21S 41/657* (2018.01); *F21S 41/663* (2018.01); *G09G 3/3611* (2013.01); *H05B 37/0227* (2013.01)

(56) References Cited

U.S. PATENT DOCUMENTS

| | | |
|---|---|---|
| 2014/0175978 A1 | 6/2014 | Kobayashi |
| 2016/0169469 A1 | 6/2016 | Sugiyama |
| 2018/0259146 A1 | 9/2018 | Sugiyama |

FOREIGN PATENT DOCUMENTS

| | | |
|---|---|---|
| EP | 3 032 168 A1 | 6/2016 |
| JP | 2005-183327 A | 7/2005 |
| JP | 2012-69458 A | 4/2012 |
| JP | 2013-054849 A | 3/2013 |

* cited by examiner

FIG. 1C $b/2 = a \tan \theta$

LIGHTING DEVICE

CROSS REFERENCE TO RELATED APPLICATION

This application is based on and claims the benefit of priority from Japanese Patent Application No. 2017-243603, the entire content of which is incorporated herein by reference.

BACKGROUND OF THE INVENTION

Field

This invention relates to a lighting device adapted for use as a car headlight.

Related Art

In recent car headlights, technique of real-time controlling light distribution pattern depending on the front circumstances such as existence of an upcoming car, referred to as adaptive driving beam (ADB), has attracted attention. According to ADB, when a car is driven with driving light distribution, i.e. high beam which illuminates both near field and far field, and an upcoming car is detected in the opposite lane, it is possible to reduce lights directed to only the area of the upcoming car among areas illuminated by the headlight. The driver of the running car is given field of view close to the high beam, whereas the driver of the upcoming car can be prevented from receiving glare.

It can be considered to form a headlight as described above by disposing a plurality of light emitting diodes (LEDs) in matrix configuration, controlling drive currents of the respective LEDs by driver circuit, and projecting forward output lights having controlled distribution through projecting optical element such as projection lens. However, a plurality of current sources will be necessary for arbitrarily controlling drive currents for the plurality of LEDs, and hence the manufacturing cost of the headlight will become high.

Such concept as disposing variable light shielding member such as a liquid crystal device including a liquid crystal element equipped with front and rear side polarizers in the output optical path of a light source such as an LED device, and pattern-controlling the output lights of the light source by the variable light shielding member has been proposed (for example JPA 2005-183327). It is enough for the light source when it can illuminate field of view, and the number of required LEDs can be limited. A variable light shielding member for controlling the entire light distribution pattern can be realized by one liquid crystal device. Liquid crystal device having a plurality of control regions capable of controlling light transmission of the respective regions can be obtained at very low price. It becomes possible to reduce the manufacturing cost of the headlight remarkably.

When light distribution pattern is to be given to output light from a light source by using a liquid crystal element having a liquid crystal layer, electrodes are disposed on both sides of the liquid crystal layer to apply voltage across the liquid crystal layer so as to control the orientation of the liquid crystal molecules, and a pair of polarizer/analyzer are disposed in front and at the rear of the liquid crystal element to control the transmission of light by the orientation of the liquid crystal molecules based on the voltage applied to the liquid crystal layer. A liquid crystal element and the pair of polarizers may collectively called a liquid crystal device. For example, a liquid crystal device employing a vertically aligned liquid crystal element and crossed Nicol polarizers, and a liquid crystal device employing a in-plane oriented liquid crystal element and crossed Nicol polarizers exhibit superior performance of normally black mode.

In order to real-time control light distribution pattern from a headlight depending on the front circumstances such as existence of an upcoming car, front monitoring unit connected with various sensors such as on-vehicle camera, radar, vehicle speed sensor, etc. is used (for example JPA 2013-054849). Information of image data supplied from the sensors is processed to detect front vehicle (upcoming car, foregoing car) etc. and calculate data necessary for controlling the light distribution pattern. Light distribution control unit determines light distribution pattern based on information supplied from the front monitoring unit.

SUMMARY

A polarizer receives incident light and extracts light component having specified polarization. Usually, non-extracted light components are disused. Thus, when light distribution pattern is formed by using a liquid crystal device, utilization ratio of light is low.

In the case of using a normally black mode liquid crystal device, when the liquid crystal device is accidentally failed to apply voltage, the whole region becomes black (dark). This is not preferable for maintaining fail-safe security.

In the ADB-operable headlight, the light distribution pattern in far field region should be locally controlled. Near field region is usually continuously illuminated, and it is unnecessary to locally control the light distribution pattern therein. For example, local control of light distribution is done through selection between transmittance state and shielding state in respective regions in field of view.

Even in adaptive front-lighting system (AFS) capable of shifting near field light distribution pattern leftward or rightward in compliance with the steering angle, main or central region is always illuminated or turned on. In the region always illuminated, local control of light distribution pattern is unnecessary.

Ordinary polarizers are heated upon absorbing lights. When heat is transferred to the liquid crystal layer, function of the liquid crystal may be damaged. To suppress heating of liquid crystal, polarizer is usually disposed to be separated from liquid crystal element. Lights injecting into a liquid crystal layer are distributed within a certain range of incident angle, and the liquid crystal element is disposed at the focal position of a projection optical system. Lights transmitting through each of the respective points in the liquid crystal element are distributed in a certain positional region on the polarizer. For controlling the lights transmitting through the liquid crystal element highly precisely, polarization of lights distributing on the plane of polarizer should be controlled.

It is desired to provide a lighting device which has a high utilization ratio of light, is capable of maintaining fail-safe security, and of achieving polarization control of light distribution pattern highly precisely.

According to an embodiment of this invention, there is provided a lighting device comprising:

a liquid crystal element having electrode pattern including a first portion and a second portion;

drive circuit connected to the electrode pattern;

a pair of polarizers disposed in front and at rear of the liquid crystal element and separated from the liquid crystal element in optical axis direction, while locally overlapping the liquid crystal element in projection normal to the liquid crystal element, and constituting crossed Nicol polarizers;

light source for supplying lights to the liquid crystal element within a predetermined incident angle range; and projection optical system for projecting lights transmitted through the liquid crystal element forwardly;

wherein when the light source is turned on, the drive circuit controls application of voltage to the first portion of the electrode pattern in compliance with circumstances, and continuously applies voltage to the second portion of the electrode pattern, lights transmitting through the first portion of the electrode pattern and projecting forward transmit the both polarizers, and lights transmitting through the second portion of the electrode pattern and projecting forward include components which do not transmit at least one of the polarizers.

In a region where control of light distribution pattern is not necessary, at least one of the polarizers can be dispensed with. Dispensing with a polarizer increases the utilization ratio of light. When one of the polarizers does not exists, no crossed Nicol polarizers are formed even in normally black mode device, and at least one polarization component is transmitted. Illumination which maintains fail-safe security is provided.

If such structure is adapted in which neither of polarizers exists in part of near field region, reduction of light intensity by using polarizer is prevented, and utilization ratio of light improves highly.

Reference Symbols: 1 light source, 2 power source, 3 liquid crystal element, 4 driver circuit, 5 light distribution control unit, 6 polarizer, 7 analyzer, 9 projection optical system, 10 lighting device, 11 preliminary polarizer, 13 polarization beam splitter, 14 ($\lambda/2$) phase shifter, 15 ($\lambda/4$) phase shifter, 16 reflector, 30 electrode pattern, 31 first portion, 32 second portion, 33 no-electrode portion, $\theta$ angle of incidence, a distance between polarizer(analyzer) and liquid crystal element, b width (height) of second portion, FF far field of view, NF near field of view.

DESCRIPTION OF THE PREFERRED EMBODIMENTS

Figure 1A:
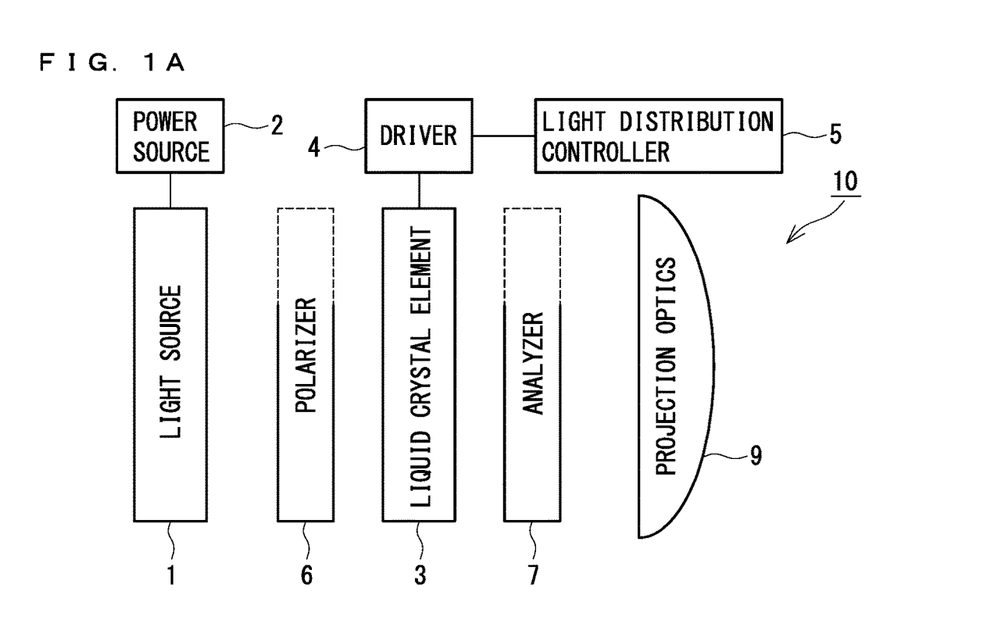
FIG. 1A is a block diagram illustrating a lighting device according to an embodiment of this invention.

Referring to FIG. 1A, a lighting device according to first embodiment will be described. Description will be made on a case where a lighting device is a car headlight. In FIG. 1A, light source 1 is a white light emitting member which includes, for example, a plurality of light emitting diode chips and fluorescence material film disposed to cover the light emitting diodes, emits lights when driven by a power source 2, and supplies white lights to a liquid crystal element 3. The liquid crystal element 3 is formed for example of a vertical alignment liquid crystal element, or an in-plane switching liquid crystal element, and is provided with a polarizer 6 and an analyzer 7 in front and at the rear thereof constituting crossed Nicol polarizers, totally constituting a liquid crystal device. The liquid crystal element 3 is driven by a driver circuit 4 which supplies driving signal based on light distribution control information supplied from light distribution control unit 5, and forms normally black type display/illumination, in corporation with crossed Nicol polarizers. Lights transmitted through the analyzer 7 are projected to car forward field by a projection optical system 9. Here, it is also possible to use a twisted nematic (TN) liquid crystal element as the liquid crystal element sandwiched between parallel Nicol polarizers.

Near field of view which occupies lower part of field of view is a region including mainly forward road surface, and far field of view which occupies upper part of field of view is a region including up-coming car and sidewalk pedestrian. Low beam from the car headlight illuminates only near field, while far field is illuminated by high beam from the car headlight. In two beam system, low beam and high beam are respectively separately formed. In one beam system, high beam illuminates far field and near field. Light distribution pattern adapted in running car is high beam. When an up-coming car is detected during running with high beam, only the lights directed to the region of the up-coming car, among the regions illuminated by the car headlight, is suppressed in real-time control. The driver is always given field of view nearly equal to high beam, and the up-coming car is protected against receiving glare. When the car headlight is turned on, the near field is the region to be always illuminated.

In case the liquid crystal element is a normally black type liquid crystal element sandwiched between crossed Nicol polarizers, when power source for driving liquid crystal element is turned off, all the emission lights are turned off, to make the region in the field of view totally black. As will be described later, at least one of the polarizer 6 and the analyzer 7 is arranged to be partially removed, then even if the liquid crystal element is failed, fail-safe security illumination is maintained for keeping safety.

Figure 1B:
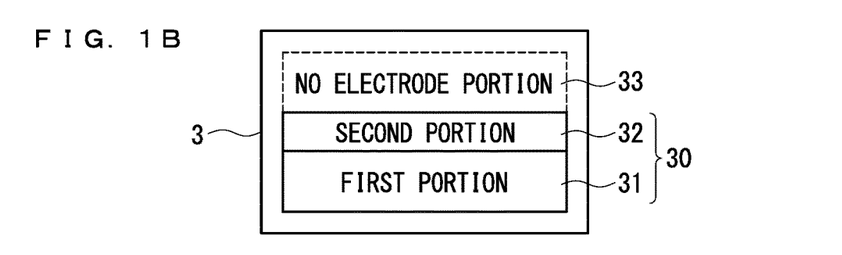
FIG. 1B is a plan view schematically illustrating structure of a liquid crystal element.

FIG. 1B illustrates schematic plan view of the liquid crystal element 3. Electrode pattern 30 driven by the drive circuit 4 is formed in the light transmissive (transparent) region of the liquid crystal element 3 including a liquid crystal layer. The electrode pattern 30 is on/off controlled according to circumstances, and includes a first portion 31 exhibiting ADB function, and a second portion 32 always applied with voltage to be in on state. The liquid crystal element 3 further includes a no-electrode region 33 disposed adjacent to the second portion and on the opposite side of the first portion 31 of the electrode pattern. The liquid crystal element 3 is upside down projected by the projection optical system 9, and hence vertical order is reversed so that far field is disposed below and near field is disposed above.

Figure 1C:
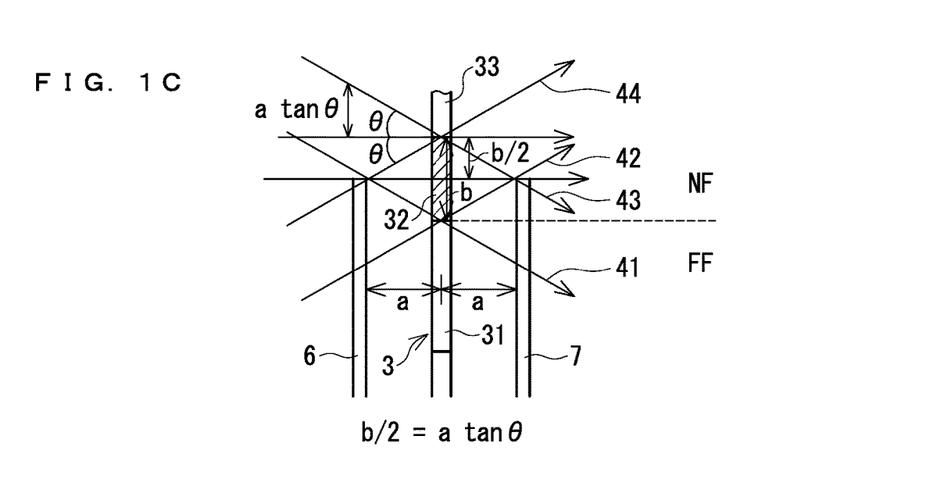
FIG. 1C is a cross section illustrating loci of light beams in a liquid crystal device including a liquid crystal element, and a pair of polarizers (polarizer/analyzer) on input and output sides thereof.

FIG. 1C is a cross section illustrating positional relationship among the first portion 31 and the second portion 32 of the electrode pattern, and the no-electrode region 33 in the liquid crystal element 3, and the polarizer 6 and the analyzer 7 disposed in front and at the rear of the liquid crystal element 3, and loci of reference light beams. For help discrimination, the second portion 32 is given with hatching. In the liquid crystal element 3, the second portion 32 disposed above the first portion 31 of the electrode pattern 30 has a vertical width b, and the no-electrode region 33 is disposed above the second portion 32. The first portion 31 of the electrode pattern corresponds to far field FF of the field of view, and the second portion 32 of the electrode pattern and the no-electrode region 33 correspond to the near field NF of the field of view.

The polarizer 6 disposed at a distance a from the liquid crystal element 3 on the optic axis on upstream side has an upper edge at a height b/2 from the upper edge of the first portion 31 of the electrode pattern 30. The upward and downward maximum angles of incidence of lights incident on the liquid crystal element 3 are denoted respectively as θ.

In the figure, two light beams passing the lower edge of the second portion 32 of width b with the maximum angle of incidence θ 41, 42, and two light beams passing the upper edge of the second portion 32 with the maximum angle of incidence θ 43, 44 are illustrated, as the reference light beams.

The light beam 41 passing the upper edge of the polarizer 6 and going downward at the maximum angle of incidence θ to the liquid crystal element 3 passes the upper edge of the first portion 31 of the electrode pattern. It can be understood that all the light beams incident on the first portion 31 of the electrode pattern are polarized by the polarizer 6. The first portion 31 of the electrode pattern receives perfectly polarized lights, and the precision of controlling transmission/shielding by polarization control can be made high. When the height of the polarizer 6 is made lower than the position of height b/2 from the top edge of the first portion 31, non-polarized lights become incident on the liquid crystal element, and the precision of the polarization control will be deteriorated.

The light beam 44 passing the upper edge of the polarizer 6 and going upward at the maximum angle of incidence θ to the liquid crystal element 3 passes the lower edge of the no-electrode portion 33. The light beam 44 does not transmit the polarizer 6, and hence is not polarized. The liquid crystal layer in the no-electrode portion 33 is not applied with a voltage, and there is no analyzer in the optical path of the light beam 44. The light beam 44 can transmit the liquid crystal layer with a high transmissivity with suppressed reduction of light intensity. When the height of the polarizer is made higher than the position of height b/2 from the top edge of the first portion 31, part of lights incident on the no-electrode portion 33 will be polarized and have reduced intensity of light by the polarization effect of the polarizer 6, and function of the high transmission will be deteriorated.

Similar analysis can be made on the lights transmitted through the liquid crystal element 3 and going to the analyzer 7. It can be proved that when the top edge of the analyzer 7 is disposed at a position of height b/2 from the top edge of the first portion 31 of the electrode pattern, polarization controllability and high transmissivity can be maximized.

It can be said that polarization control and high transmissivity can be improved when the top edges of the polarizer 6 and the analyzer 7 disposed at positions a in front and at the rear of the liquid crystal element 3 on the optic axis are positioned at intermediate heights (typically at height b/2) of the second portion 32 of the electrode pattern 30.

When light incident on the liquid crystal element 3 at the maximum angle of incidence θ goes a distance a along the optic axis, it changes the vertical position by (a*tan θ). According to the arrangement illustrated in FIG. 1C, relation of (b/2)=(a*tan θ) holds. When relation (b/2)>(a*tan θ) holds, transmissivity of the no-electrode region may decrease somewhat, but the polarization controllability does not change. Practically, it can be said that relation of (b/2)≥(a*tan θ) is preferable.

Analysis has been made on the case in which the distance a along the optic axis and the angle of incidence θ are constant. When these parameters have different values, consideration may be made on larger values of a and θ.

The second portion 32 of the electrode pattern in the liquid crystal element 3 controls illumination on near field NF, and hence is preferable to have normally transparent nature. Then, the electrode in the second portion 32 is preferably always applied with voltage from the driver circuit 4 to make it transmissive (transparent). When some functional failure occurs in the liquid crystal element 3 to interrupt the voltage application, the first portion 31 and the second portion 32 will not be applied with voltage. Lights expected to transmit the first portion 31 and the second portion 32 of the electrode pattern will be shielded by the polarizer 6 and the analyzer 7. In this state, lights passing above the upper edge of the polarizer 6 and the analyzer 7 and not being polarized can freely pass through the liquid crystal element 3. Further among lights distributed between the light beams 41 and 44 and lights distributed between the light beams 43 and 42, lights which do not pass one of the polarizer 6 and the analyzer 7 will not be shielded. These lights pass the liquid crystal element and maintain the fail-safe illumination.

Figure 2A:
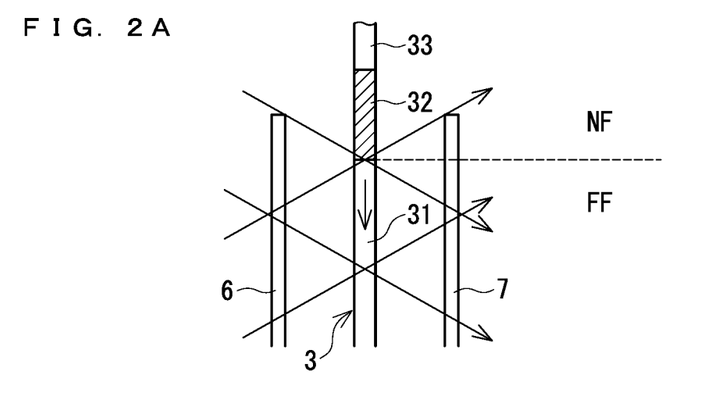
FIG. 2A is a schematic cross section illustrating loci of light beams transmitting through a section in the first portion of the electrode pattern where the voltage across the liquid crystal layer is locally controlled according to the circumstances in the first embodiment.

FIG. 2A is a cross section illustrating loci of lights passing through the first portion 31 (high beam area) of electrode pattern in the liquid crystal element 3. The polarizer 6 and the analyzer 7 constitute crossed Nicol polarizers. The first portion 31 of the electrode pattern is normally applied with voltage to cause polarization axis change, and the structure becomes transmissive (transparent). When voltage application in selected region of the electrode pattern is turned off, the polarization axis change disappears, and selective light shielding occurs in the selected region to prevent glare to the upcoming car, etc.

Figure 2B:
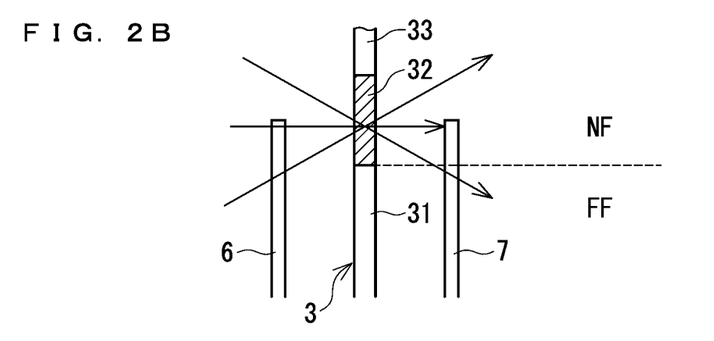
FIG. 2B is a schematic cross section illustrating loci of light beams transmitting through the second portion of the electrode pattern where the voltage across the liquid crystal layer is always applied in the first embodiment.

FIG. 2B is a cross section illustrating loci of light beams passing through the second portion 32 (upper part of near field of view) of electrode pattern in the liquid crystal element 3. The second portion is a region normally applied with voltage and having transmissivity (transparency). When the applied voltage is interrupted by some reason as failure of the liquid crystal device, the structure becomes light-shielding against the light beam transmitting through the polarizer 6, liquid crystal element 3 and the analyzer 7. For those light beams transmitting above the two top edges of the polarizer 6 and the analyzer 7, crossed Nicol polarizers are not formed. Thus, the structure can transmit those lights. Light beams being obliquely incident to the surface of the liquid crystal element 3, and do not transmit both of the polarizer 6 and the analyzer 7 (do not transmit the crossed Nicol polarizers) also transmit the structure.

Figure 2C:
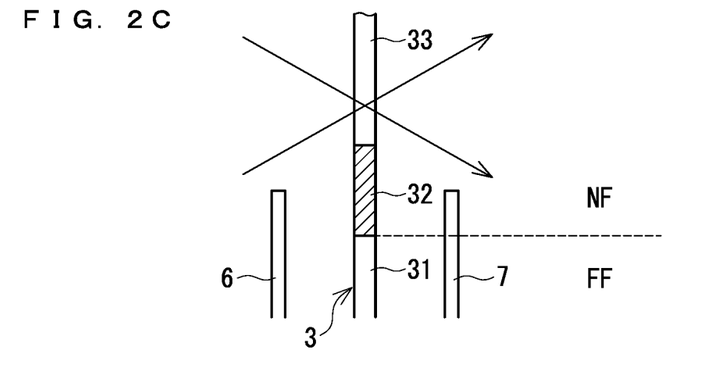
FIG. 2C is a schematic cross section illustrating loci of light beams transmitting through the no-electrode region of the liquid crystal element in the first embodiment.

FIG. 2C is a cross section illustrating loci of light beams transmitting through the no-electrode portion 33 (lower part of the near field of view) of the liquid crystal element 3. Since there is no electrode, voltage is not applied to the liquid crystal layer, and change in transmission through the liquid crystal layer does not occur. There are no polarizer 6 nor analyzer 7 (no crossed Nicol polarizers). The incident lights transmit the liquid crystal layer. Reduction in the intensity of light by selection of polarization is also prevented.

In the first embodiment, parts of both the polarizer and the analyzer disposed in parallel to the liquid crystal element are cut off. There are some cases where one of the polarizer and the analyzer is desired to overlap the whole area of the liquid crystal element. When one of the polarizer and the analyzer overlaps the whole area of the liquid crystal element, utilization ratio of light becomes deteriorated. But, in the case of total overlap, there is no need of aligning the boundaries.

Figure 3A:
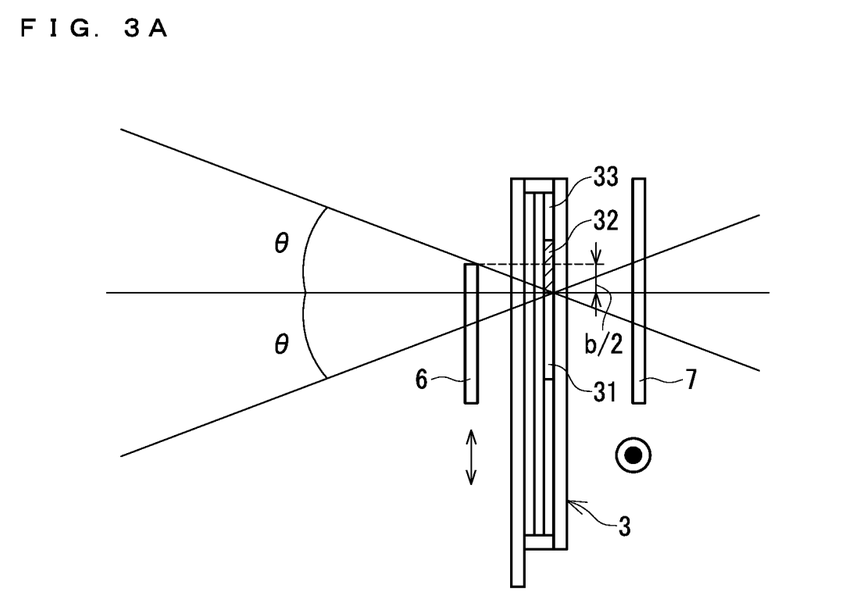
FIGS. 3A and 3B are cross sections illustrating the liquid crystal device of the lighting device according to first and second examples of the second embodiment.
Figure 3B:
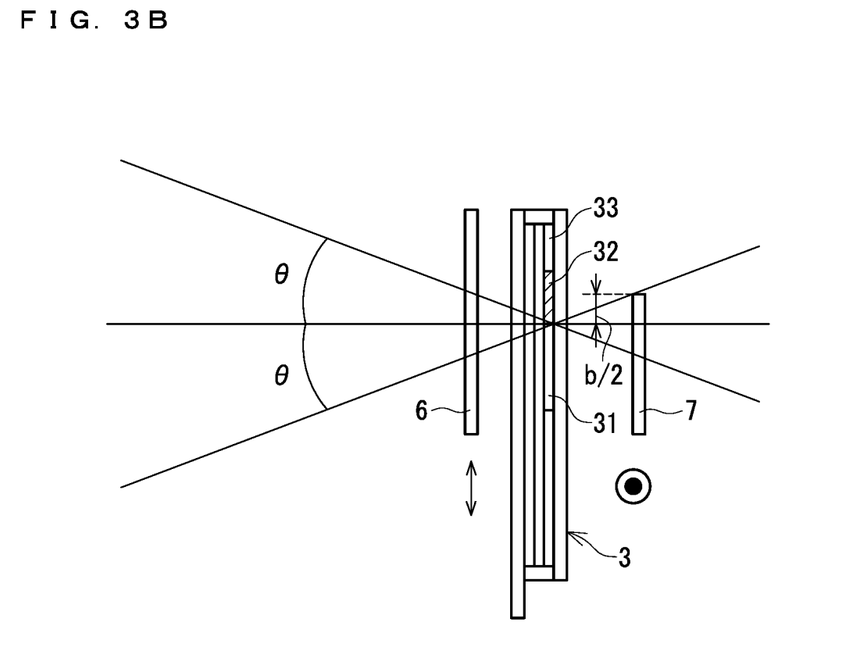

FIGS. 3A and 3B are cross sections illustrating combinations of polarizer 6, liquid element 3 and analyzer 7 of first and second examples of the second embodiment. In FIG. 3A an analyzer 7 is totally overlapping light transmitting portion of a liquid crystal element 3, and in FIG. 3B a polarizer 6 is totally overlapping light transmitting portion of a liquid crystal element 3.

In FIG. 3A, the upper edge of the polarizer 6 is disposed at a height position b/2 above the upper position of the first portion 31 of the electrode pattern of the liquid crystal element 3. In FIG. 3B, the upper edge of the analyzer 7 is disposed at a height position b/2 above the upper position of the first portion 31 of the electrode pattern of the liquid crystal element 3.

Dispensing with part of polarizer/analyzer in a region where control of light distribution pattern is unnecessary improves utilization ratio of light. Even in normally black mode device, illumination for maintaining fail-safe security can be provided. This aspect is similar to the first embodiment. The provision of high polarization controllability in which all the light beams passing through the first portion 31 of the electrode pattern of the liquid crystal element 3, wherein voltage application is on/off controlled, are subject to the polarization control by the polarizer 6 and the analyzer 7 is also similar to the first embodiment.

In the first and the second embodiments, the lower edge of the no-electrode portion 33 is positioned above the upper edge of the partly removed polarizer 6 or analyzer 7, to improve the utilization ratio of light incident on the no-electrode portion 33. It is possible to dispense with this condition.

Figure 4:
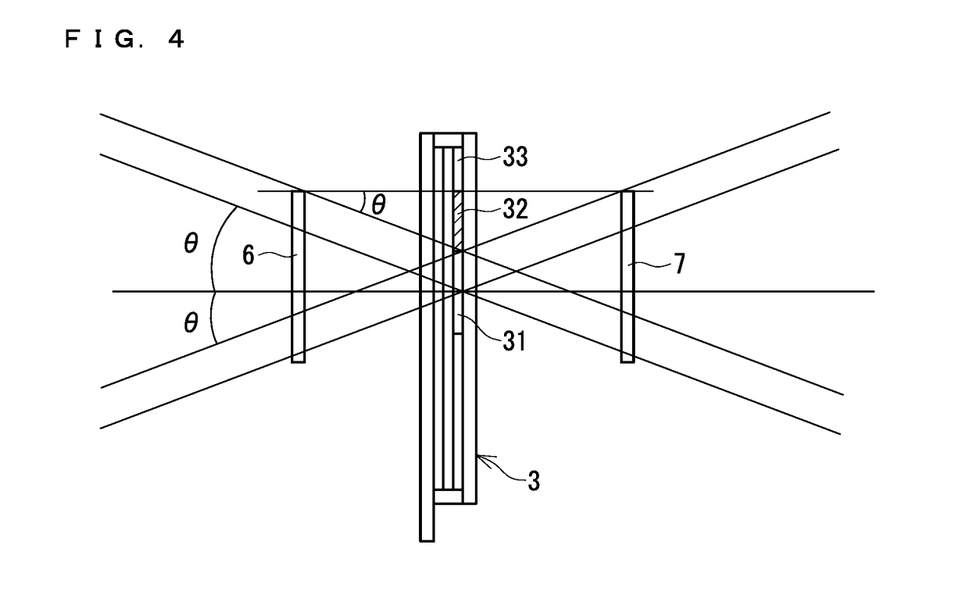
FIG. 4 is a cross section illustrating the liquid crystal device in the lighting device according to the third embodiment.

FIG. 4 is a cross section of combination of the polarizer 6, the liquid crystal element 3 and the analyzer 7, according to the third embodiment. Different point from the first embodiment is that the upper edge of the second portion 32 of the electrode pattern of the liquid crystal element 3 and the upper edges of the polarizer 6 and the analyzer 7 are positioned at the same height. The point that the light beam passing the upper edge of the polarizer 6 and going downward with the maximum angle of incidence θ to the liquid crystal element 3 passes the upper edge of the first portion 31 of the electrode pattern is also similar to the first embodiment.

The point that all the lights incident on the first portion 31 of the electrode pattern of the liquid crystal element 3 are subjected to polarization control by the polarizer 6 is similar to the first embodiment. However, among the light beams incident on the no-electrode portion 33 of the liquid crystal element 3, many of the obliquely incident light beams are subjected to polarization control of the polarizer 6 or the analyzer 7, and the utilization ratio of light beams passing through the no-electrode portion becomes deteriorated.

In the above embodiments, lights emitted from a light source are converted to linearly polarized lights by a polarizer. When other components of lights than the selected polarized lights are not used, the utilization ratio of light is low. It is possible to align substantially all lights emitted from a light source to polarized lights aligned along one direction.

Figure 5A:
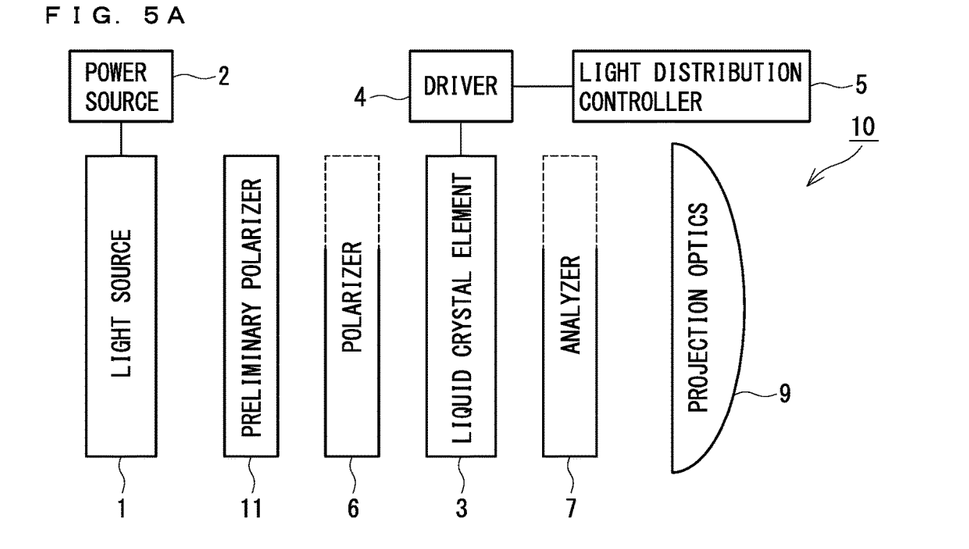
FIG. 5A is a block diagram of the lighting device according to the fourth embodiment.

FIG. 5A is a block diagram illustrating lighting device according to fourth embodiment. Comparing to the structure of the first to third embodiments illustrated in FIG. 1A, difference exists in insertion of a preliminary polarizer 11 between the light source 1 and the polarizer 6. The preliminary polarizer 11 preliminarily polarizes lights emitted from the light source 1 substantially along the same direction as the polarization formed by the polarizer 6. Other aspects are almost the same as the first to third embodiments.

Figure 5B:
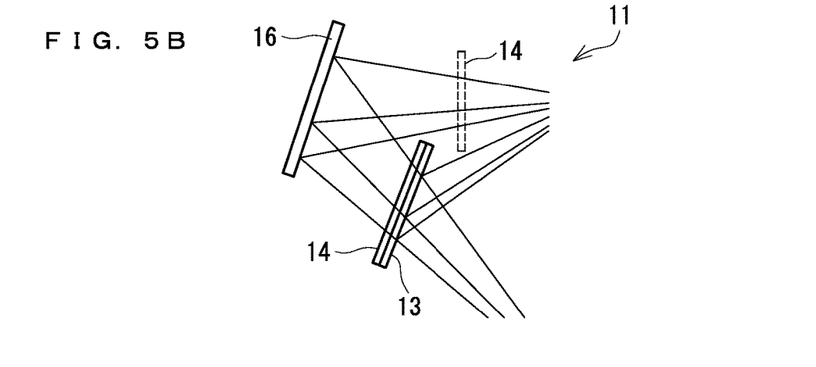
FIGS. 5B and 5C are cross sections illustrating first and second examples of preliminary polarizer according to the fourth embodiment.

FIG. 5B is a cross section illustrating first example of the preliminary polarizer 11. Lights emitted from the light source are received by a polarization beam splitter 13 such as wire grid polarizer or dielectric multilayer polarizer. For example, a wire grid polarizer has a structure in which conductive wires are disposed in parallel, to transmit polarized lights having electric vectors orthogonal to the wires, and reflect polarized lights having electric vectors parallel with the wires. The polarization beam splitter generates two kinds of polarizations, i.e. reflected polarized lights and transmitted polarized lights. The polarization axis of polarization transmitted through the polarization beam splitter 13 is rotated by a (λ/2) phase shifter plate 14, to have the same polarization direction with the reflected polarization, and reflected by a reflector 16 to propagate along the same propagation direction as the reflected polarization. Two kinds of polarizations are arranged to have almost the same propagation directions. Lights emitted from the light source are substantially fully converted to polarizations of the same polarization direction and the same propagation direction. The position of the (λ/2) phase shifter plate 14 may be changed from an upstream position of the reflector 16 as illustrated in solid line to an downstream position of the reflector 16 as illustrated in broken line.

Polarized lights obtained from the preliminary polarizer 11 are further polarized by the polarizer 6 to form polarized lights of high polarization ratio. The preliminarily polarized lights incident on the polarizer 6 is arranged to have aligned direction with the polarization direction of the polarizer 6. Those polarization components not utilized by the polarizer 6 and disused reduce tremendously, to improve the utilization ratio of light. It may be noted that almost all the incident lights become polarized lights. For the purpose of maintaining illumination in the case of failure in the liquid crystal device etc., the structure in which the analyzer 7 is distributed all over the light transmission plane as illustrated in FIG. 3A, is not preferable. As the combination of the polarizer 6, the liquid crystal element 3, and the analyzer 7, structures of other embodiments may be used.

Figure 5C:
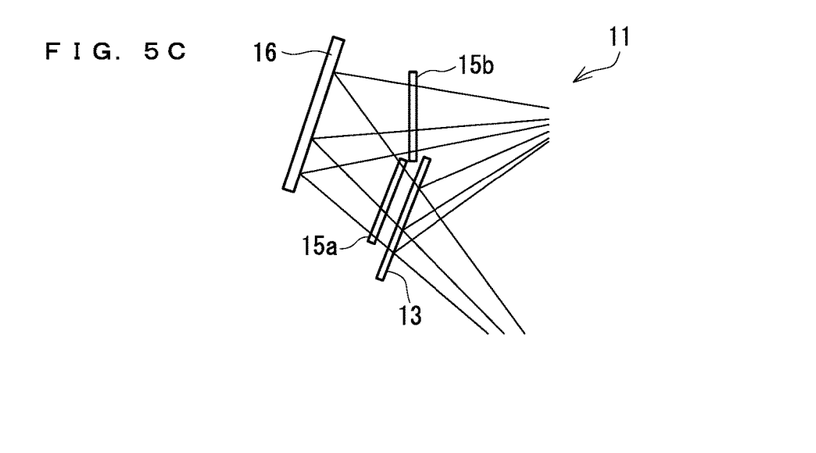

FIG. 5C illustrates a case wherein two (λ/4) phase shifter plates 15a and 15b are used in place of single (λ/2) phase shifter plate 14. When a polarized light beam is processed in various optical instruments etc., the degree of polarization decreases. Two (λ/4) phase shifter plates 15a and 15b having aligned axes jointly serve similar to one (λ/2) phase shifter plate. Further between the two (λ/4) phase shifter plates, the propagating light becomes circularly polarized light. Circularly polarized light is less degraded its polarization quality even when it is reflected by a reflector having a curved reflection surface. In case of using optical system using multiple curved reflection surfaces, the structure of using two ($\lambda$/4) phase shifter plates at upstream and downstream of reflector element is very preferable. The preliminary polarizer 11 of FIG. 5C can be used in combination with lighting device of the above embodiments, except the structure in which the analyzer is disposed on all the light transmission surface of the liquid crystal element such as illustrated in FIG. 3A, to form an illumination device of FIG. 5A.

Structures using polarization beam splitter as illustrated in FIGS. 5B and 5C to polarize incident light beam can be used in place of the polarizer 6 of FIG. 1A.

The present invention has been described along the preferred embodiments. The invention is not limitative to these embodiments. It will be apparent to those skilled in the art that various modifications, improvements, combinations, replacements, etc. can be made.

What are claimed are:

1. A lighting device comprising:
 a liquid crystal element having electrode pattern including a first portion and a second portion;
 drive circuit connected to the electrode pattern;
 polarizer disposed in front of the liquid crystal element and separated from the liquid crystal element in optical axis direction;
 analyzer disposed at rear of the liquid crystal element, and separated from the liquid crystal element in optical axis direction,
 wherein the polarizer and the analyzer constitute crossed Nicol polarizers;
 light source for supplying lights to the liquid crystal element within a predetermined incident angle range; and
 projection optical system projecting lights transmitted through the liquid crystal element forwardly;
 wherein the polarizer and the analyzer locally overlap with the liquid crystal element in projection normal to the liquid crystal element, and
when the light source is turned on, the drive circuit supplies drive signal to the first portion of the electrode pattern which applies or releases voltages in compliance with circumstances, and supplies drive signal to the second portion of the electrode pattern which continuously applies voltage, lights transmitting through the first portion of the electrode pattern and projecting forward transmit both the polarizer and the analyzer, and lights transmitting through the second portion of the electrode pattern and projecting forward include components which do not transmit at least one of the polarizer and the analyzer.

2. The lighting device according to claim 1, wherein the liquid crystal element, when projected forward, includes a far field area disposed at a vertically high portion and a near field area disposed vertically lower than the far field area, and the first portion of the electrode pattern belongs to the far field area and the second portion of the electrode pattern belongs to the low field area.

3. The lighting device according to claim 2, wherein the liquid crystal element includes a no-electrode region having no electrode at a location adjacent to the second portion and opposite to the first portion of the electrode pattern.

4. The lighting device according to claim 3, wherein the no-electrode region belongs to the near field area.

5. The lighting device according to claim 2, wherein provided that the second portion of the electrode pattern has width b with respect to vertical direction in field of view, that one of the polarizer and the analyzer nearer to the liquid crystal element has distance a from the liquid crystal element, and that maximum angle of incidence be denoted as $\theta$, relation $(b/2) \geq (a * \tan \theta)$ holds.

6. The lighting device according to claim 2, wherein the polarizer is partially removed in a region corresponding to the near field area.

7. The lighting device according to claim 6, wherein the second portion of the electrode pattern of the liquid crystal element has a height higher than the polarizer with respect to vertical direction in field of view.

8. The lighting device according to claim 2, wherein the analyzer is partially removed in a region corresponding to the near field area.

9. The lighting device according to claim 8, wherein the second portion of the electrode pattern of the liquid crystal element has a height higher than that of the analyzer with respect to vertical direction in field of view.

10. The lighting device according to claim 1, further comprising structure which causes polarization along the polarization direction of polarizer between the light source and the polarizer.

* * * * *